United States Patent
Lin et al.

(10) Patent No.: US 11,010,927 B2
(45) Date of Patent: May 18, 2021

(54) METHOD AND SYSTEM FOR GENERATING DYNAMIC MAP INFORMATION CAPABLE OF PROVIDING ENVIRONMENT INFORMATION

(71) Applicant: AUTOMOTIVE RESEARCH & TESTING CENTER, Changhua Hsien (TW)

(72) Inventors: Hsuan-Ta Lin, Changhua Hsien (TW); Cheng-Kai Wang, Changhua Hsien (TW); Chun-Yao Shih, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 0 days.

(21) Appl. No.: 16/654,525

(22) Filed: Oct. 16, 2019

(65) Prior Publication Data
US 2021/0118183 A1    Apr. 22, 2021

(51) Int. Cl.
| | |
|---|---|
| *G06K 9/00* | (2006.01) |
| *B60R 25/10* | (2013.01) |
| *G06T 7/00* | (2017.01) |
| *G08G 1/16* | (2006.01) |
| *G06T 7/60* | (2017.01) |
| *G06T 7/70* | (2017.01) |

(Continued)

(52) U.S. Cl.
CPC ............. *G06T 7/97* (2017.01); *G01S 7/4808* (2013.01); *G01S 17/89* (2013.01); *G01S 17/931* (2020.01); *G06T 7/60* (2013.01); *G06T 7/70* (2017.01); *G08G 1/164* (2013.01); *G06T 2207/10028* (2013.01); *G06T 2207/20221* (2013.01); *G06T 2207/30261* (2013.01)

(58) Field of Classification Search
USPC ....... 382/100, 103, 104, 154–155, 162, 168, 382/173, 181, 206, 219, 224, 254, 276, 382/286–291, 305, 312; 340/936, 934, 340/994, 426.19
See application file for complete search history.

(56) References Cited

U.S. PATENT DOCUMENTS

| | | | |
|---|---|---|---|
| 2018/0216942 A1* | 8/2018 | Wang | G01S 17/89 |
| 2019/0139403 A1* | 5/2019 | Alam | H04W 4/40 |

(Continued)

*Primary Examiner* — Seyed H Azarian
(74) *Attorney, Agent, or Firm* — Rabin & Berdo, P.C.

(57) ABSTRACT

A method and a system for generating dynamic map information with environment information are provided, wherein the system includes a cloud server, multiple relay hosts distributed around the environment and multiple vehicle devices each installed respectively in different vehicles. Each vehicle device includes a LiDAR sensor and a camera for sensing the environment to respectively generate point cloud data and image data. When the point cloud data from different vehicles are transmitted to a neighboring relay host, the relay host performs a multi-vehicle data integration mode to merge the point cloud data and obtain 3D coordinates information of objects in the environment according to the merged data. Based on the 3D coordinates information of objects, the cloud server generates and transmits dynamic map information to the vehicles. By sharing sensing data of different vehicles, the sensing area of each vehicle is expanded to mitigate dark zones or blind zones.

19 Claims, 10 Drawing Sheets

(51) Int. Cl.
  *G01S 7/48*  (2006.01)
  *G01S 17/89*  (2020.01)
  *G01S 17/931*  (2020.01)

(56) References Cited

U.S. PATENT DOCUMENTS

| | | | |
|---|---|---|---|
| 2019/0178989 A1* | 6/2019 | Tsai | G01S 17/42 |
| 2019/0222652 A1* | 7/2019 | Graefe | H04W 84/18 |
| 2019/0361456 A1* | 11/2019 | Zeng | G01C 21/20 |
| 2020/0004241 A1* | 1/2020 | Levinson | G08G 1/202 |
| 2020/0324795 A1* | 10/2020 | Bojarski | G06K 9/00798 |

* cited by examiner

METHOD AND SYSTEM FOR GENERATING DYNAMIC MAP INFORMATION CAPABLE OF PROVIDING ENVIRONMENT INFORMATION

BACKGROUND OF THE INVENTION

1. Field of the Invention

The present invention relates to a method for automatically identifying environment information, and more particularly to a method for identifying obstacles by using LiDAR information and image information.

2. Description of the Related Art

With the ever-changing and fast-developing artificial intelligence (AI) and mechanical learning technologies, many international companies adapt this novel machine learning in research and development of self-driving. A self-driving system equipped in vehicles is able to detect situations of the environment around the vehicles through sensor fusion and based on sensing results makes a proper judgment to control the vehicle.

Figure 10:
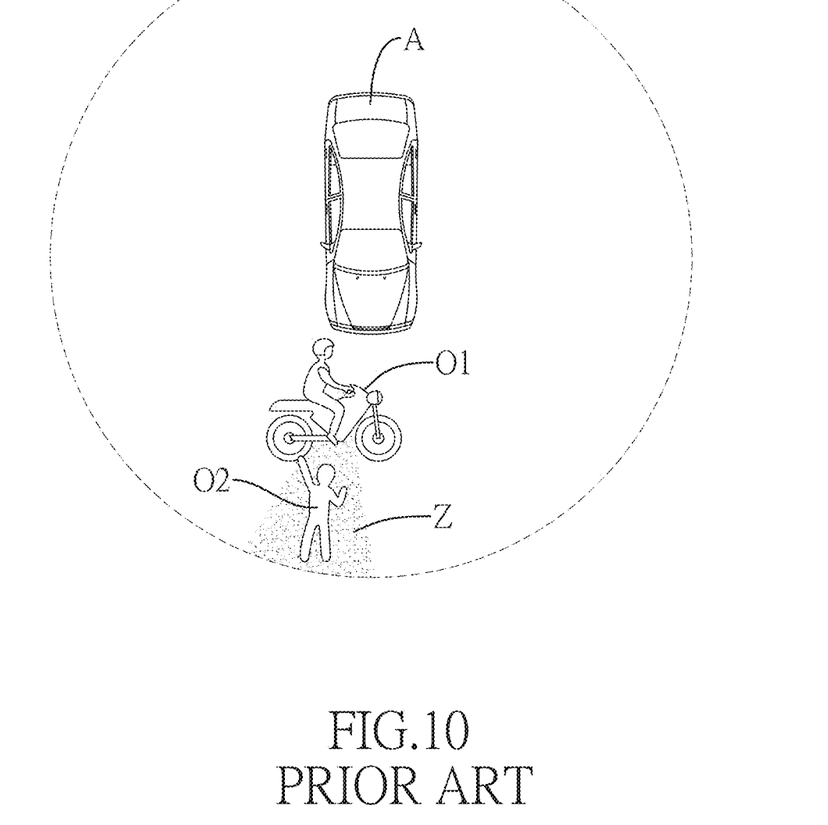
FIG. 10 is a schematic view showing a dark zone or a blind zone for a vehicle.

If sensing results are all obtained by sensors provided in one single vehicle for sensing the environment, the viewing angle and moving direction of the vehicle may result in a dark zone or a blind zone for the vehicle when multiple obstacles are adjacent to each other. For example, with reference to FIG. 10, if a first obstacle O1 and a second obstacle O2 are in front of the vehicle A, the vehicle A may only recognize the first obstacle O1. The second obstacle O2 behind the first obstacle O1 is in the dark zone Z for the vehicle A and is undetectable.

Light detection and ranging (LiDAR) device is widely used in self-driving systems. It can quickly sense the surrounding environment and generate point cloud data representing the surrounding environment. According to the point cloud data, the three-dimensional (3D) geometric information of the surrounding environment is obtained.

However, the LiDAR still has the problem described above. When there are multiple objects adjacent to each other, the geometric information of the object cannot be completely obtained. Therefore, it is unfavorable to subsequently determine whether the object is an obstacle.

SUMMARY OF THE INVENTION

An objective of the present invention is to provide a system for generating dynamic map information capable of providing environment information. The system comprises multiple vehicle devices, multiple relay hosts, and a cloud server.

The multiple vehicle devices are each respectively installed in different vehicles. Each of the vehicle devices comprises a light detecting and ranging (LiDAR) sensor sensing an environment around the vehicle to generate point cloud data; a camera capturing the environment around the vehicle to generate image data; a vehicle controller connected to the LiDAR sensor, the camera and a data transmission unit, controlling the point cloud data and the image data to be transmitted through the data transmission unit; and a human-machine interface connected to the vehicle controller.

Each relay host receives the point cloud data and the image data from the vehicles around the relay host itself and performs a multi-vehicle data integration mode to merge the point cloud data received from the vehicles to generate a processing result containing 3D coordinates information of objects in the environment.

The cloud server communicates with the multiple relay hosts and the multiple vehicle devices, receives the processing result of the multi-vehicle data integration mode, and integrates the 3D coordinates information of objects with a base map to generate dynamic map information. The cloud server transmits the dynamic map information to the human-machine interface of each vehicle device.

Another objective of the present invention is to provide a method for generating dynamic map information capable of providing environment information.

The method comprises steps of:

(a) sending a confirmation request from a vehicle device installed in a vehicle to a cloud server;

(b) designating a relay host among multiple relay hosts and informing the vehicle device of the relay host being designated by the cloud server, wherein the cloud server refers to a location of the vehicle to designate the relay host near the vehicle;

(c) transmitting point cloud data and image data from the vehicle to the relay host being designated by the vehicle device, wherein the point cloud data is provided by a LiDAR sensor that senses an environment around the vehicle, and the image data is provided by a camera that captures the environment around the vehicle;

(d) when the relay host receives the point cloud data and the image data from multiple vehicles, the relay host performing a multi-vehicle data integration mode to merge the point cloud data received from the multiple vehicles to generate a processing result containing 3D coordinates information of objects in the environment;

(e) the cloud server receiving the processing result of the multi-vehicle data integration mode from the relay host, and integrating the 3D coordinates information of objects with a base map to generate dynamic map information; and (f) the cloud server transmitting the dynamic map information to the human-machine interface of each vehicle device, wherein the dynamic map information contains 3D coordinates information of the objects in the environment.

By integrating the point cloud data sensed by LiDAR sensors of different vehicles, the sensing area of each vehicle can be expanded to identify more objects around the vehicle. The 3D coordinates information of the objects can be combined with a base map to create dynamic map information. The dynamic map information is transmitted to each vehicle to achieve the objective of environment information sharing.

When the invention is applied to the self-driving vehicles, the preferable dynamic map information is high definition map (HD MAP). The HD MAP can be used by the control system in the self-driving vehicle for automatically programing safe traveling routes and avoiding collisions with the identified obstacles.

Other objectives, advantages and novel features of the invention will become more apparent from the following detailed description when taken in conjunction with the accompanying drawings.

DETAILED DESCRIPTION OF THE INVENTION

Figure 1:
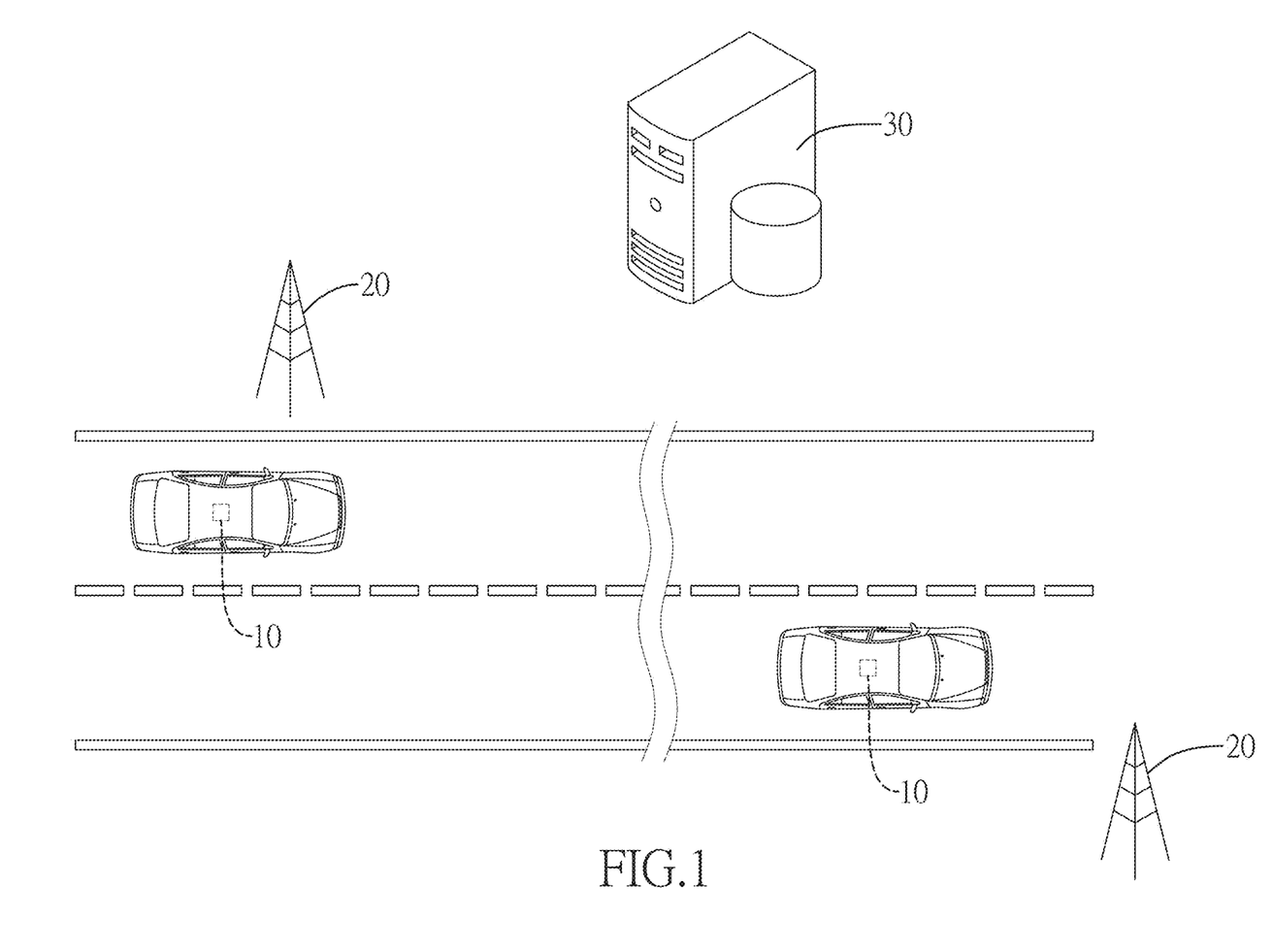
FIG. 1 is a schematic view of a system in accordance with the present invention.
Figure 2:
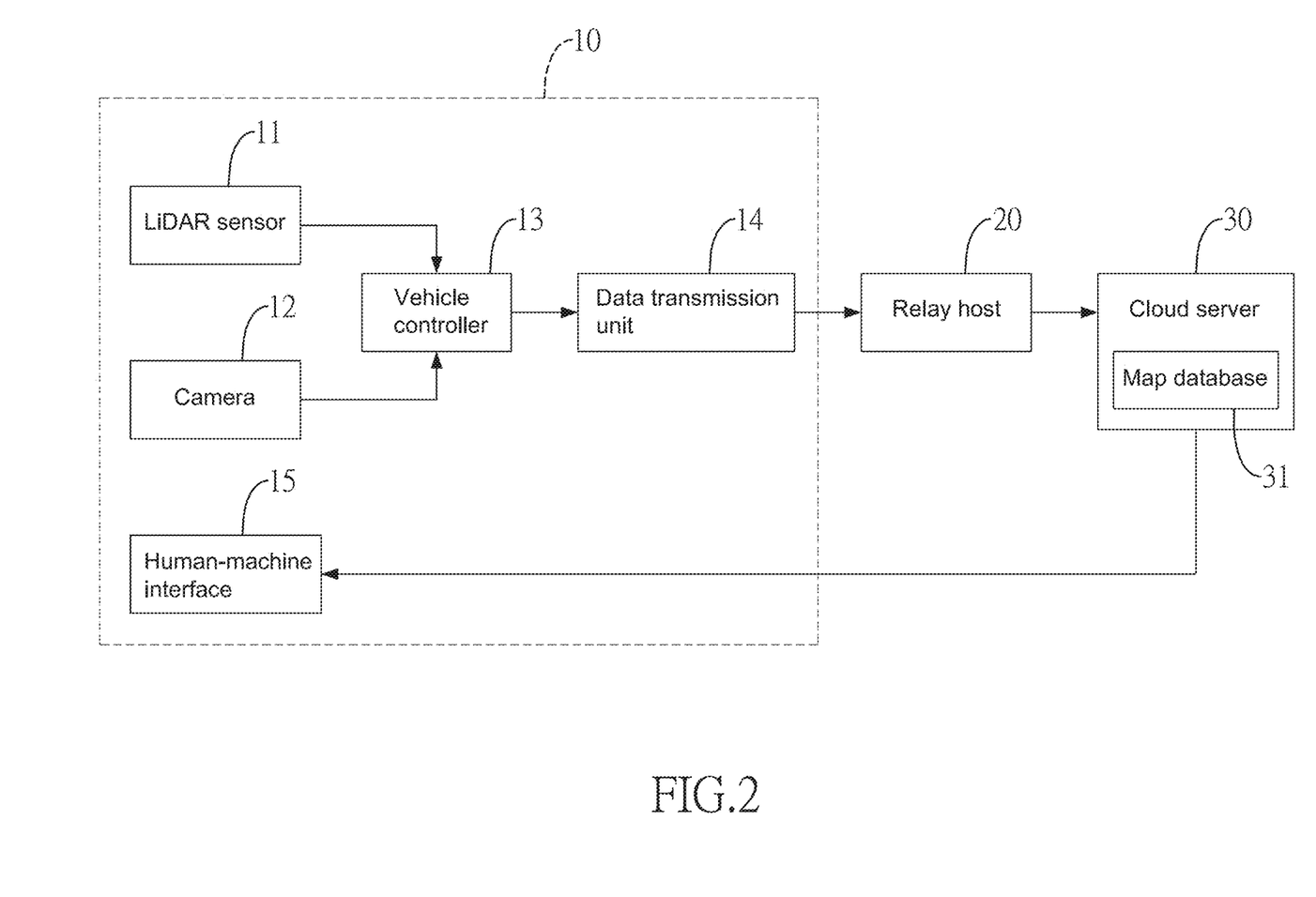
FIG. 2 is a block diagram of the system in accordance with the present invention.

With reference to FIGS. 1 and 2, a system for generating dynamic map information of the present invention comprises vehicle devices 10 each respectively installed in vehicles, multiple relay hosts 20 provided in the environment and preferably being near roads, and a cloud server 30.

Each vehicle device 10 comprises a light detection and ranging (LiDAR) sensor 11, a camera 12, a vehicle controller 13, a data transmission unit 14, and a human-machine interface (HCI) 15. The LiDAR sensor 11 is connected to the vehicle controller 13 and senses an environment around the vehicle to generate point cloud data. The camera 12 is connected to the vehicle controller 13 and captures images around the vehicle to generate image data. The vehicle controller 13 transmits the point cloud data and the image data through the data transmission unit 14, wherein a unique vehicle identification code for the vehicle is pre-stored in the vehicle controller 13 for identifying the vehicle among multiple vehicles. The data transmission unit 14 is a wireless communication unit for data transmission among the vehicle device 10, the relay host 20 and the cloud server 30.

The relay hosts 20 are built and distributed around the environment to establish vehicle-to-infrastructure (V2I) communication with the vehicle device 10. Each of the relay hosts 20 has a unique host identification code. The relay hosts 20 also communicate with the cloud server 30.

The cloud server 30 is able to access a map database 31 in which basic environment information used as a base map is stored. The cloud server 30 integrates data processed by the relay hosts 20 with the base map in the map database 31 to generate dynamic map information, and then transmits the dynamic map information to the human-machine interface 15 of each vehicle device 10.

Figure 3:
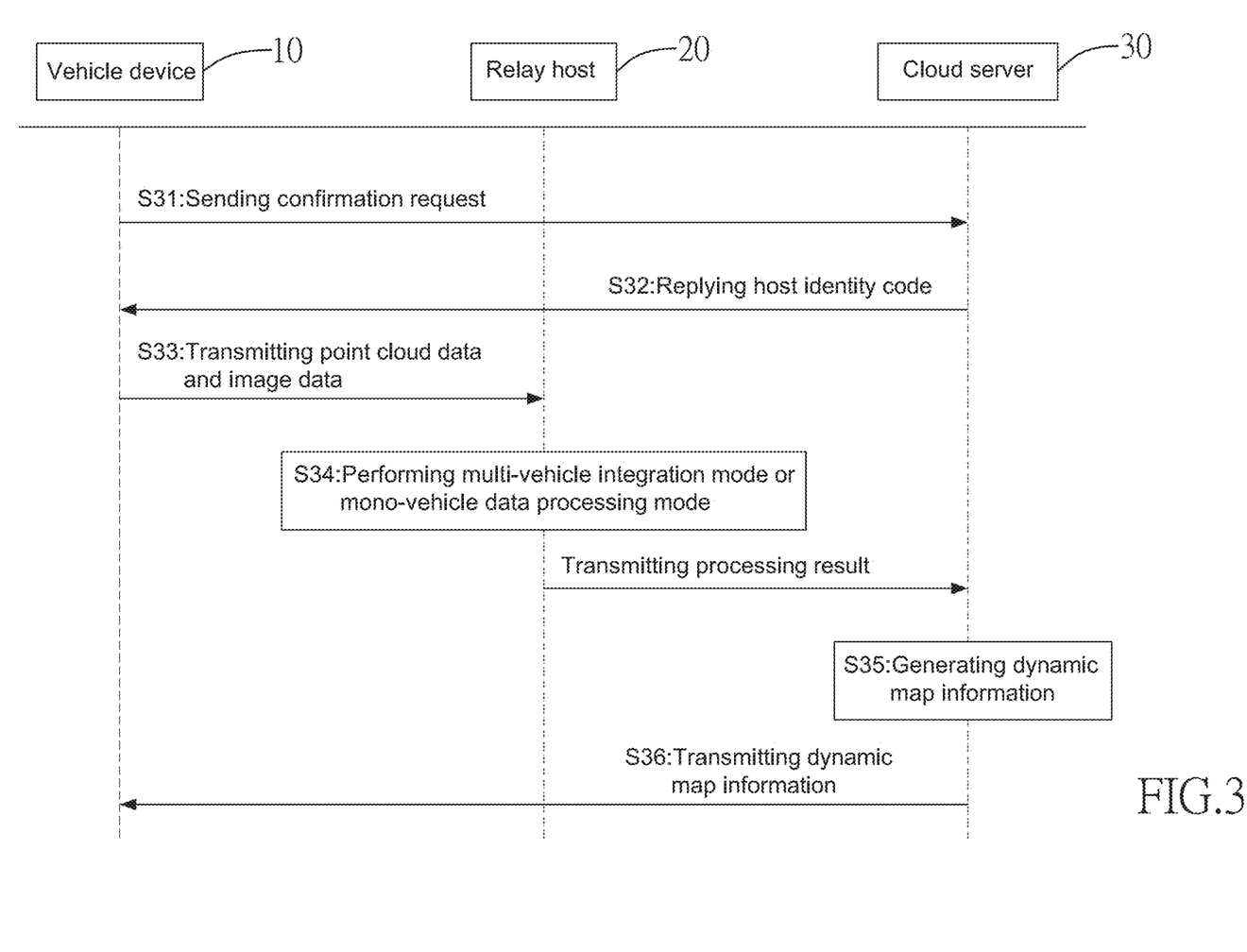
FIG. 3 shows a flowchart of cooperation among a vehicle device, a relay host and a cloud server in accordance with the present invention.

With reference to FIG. 3, the cooperation among the vehicle device 10, the relay devices 20 and the cloud server 30 includes the steps as follows.

S31: The vehicle device 10 of a vehicle sends a confirmation request to the cloud server 30 to inquire whether there is a relay host 20 around the vehicle itself. For the cloud server 30, the cloud server 30 may receive more than one confirmation requests from different vehicle devices 10 at the same time.

S32: The cloud server 30 designates a relay host 20 available for the vehicle according to a location of the vehicle sending the confirmation request and provides the host identification code of the designated relay host 20 to the vehicle sending the confirmation request, wherein the cloud server 30 can obtain the location of the vehicle sending the confirmation request according to its GPS information.

S33: After the vehicle device 10 sending the confirmation request receives reply information from the cloud server 30, the vehicle device 10 uploads its sensing data including the point cloud data and the image data, as well as the vehicle identification code of the vehicle to the relay host 20 designated by the cloud server 30. If there is only one vehicle sending the confirmation request near the relay host 20, the relay host 20 only receives the sensing data from the vehicle. If there are multiple vehicles sending their confirmation requests near the relay host 20, the relay host 20 receives the sensing data from the multiple vehicles.

S34: Based on the sensing data received from each of the vehicle devices 10, the designated relay host 20 determines whether a "mono-vehicle data processing mode" or a "multi-vehicle data integration mode" should be performed and processed, and transmits the processed results of either the mono-vehicle data processing mode or the multi-vehicle data integration mode, as well as the host identification code to the cloud server 30. When there is only one vehicle around the relay host 20, the relay host 20 receives the sensing data only from the single vehicle device 10 and performs the "mono-vehicle data processing mode. Otherwise, when there are more than two different vehicles around the relay host 20, the relay host 20 receives multiple pieces of sensing data from the different vehicles and performs the "multi-vehicle data integration mode". The mono-vehicle data processing mode and the multi-vehicle data integration mode will be described in detail below.

S35: The cloud server 30 receives the processed results from the relay host 20 and combines the processed data with the base map to generate dynamic map information. Since the processed results include the three-dimensional (3D) coordinate information of obstacles surrounding the vehicle, the dynamic map information will accordingly include the coordinate information of the objects surrounding the vehicle.

S36: The cloud server 30 transmits the dynamic map information back to the human-machine interface 15 of the vehicle. When transmitting the dynamic map information, the cloud server 30 determines the recipient vehicle to which the dynamic map information should be transmitted according to the vehicle identification code.

Figure 4:
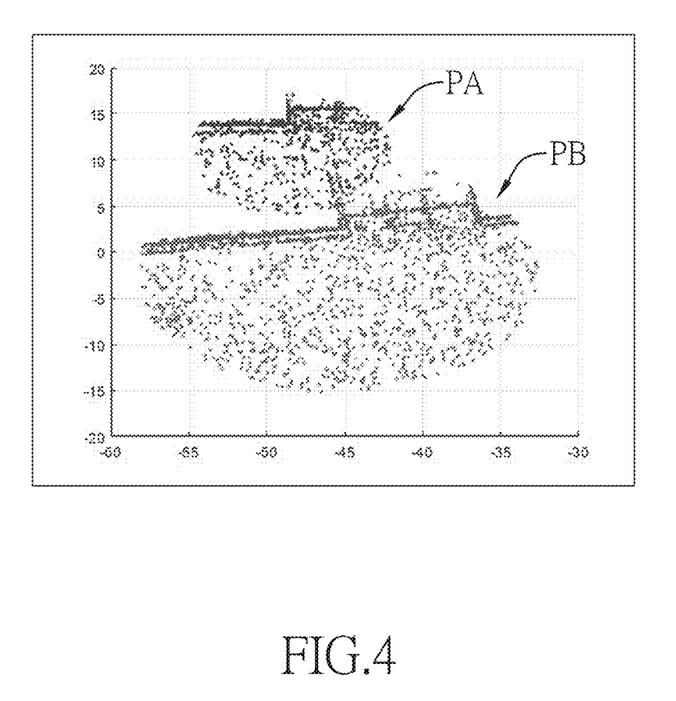
FIG. 4 shows two groups of point cloud data PA, PB obtained by two LiDAR respectively.

With regard to the multi-vehicle data integration mode in step S34, when the relay host 20 receives data from more than two different vehicles, because the vehicles are at different locations, the point cloud data for the same object sensed by the LiDAR sensors 11 on the vehicles may be different from each other. With reference to FIG. 4, a first group of point cloud data PA and a second group of point cloud data PB for the same target are schematically shown. The first group of point cloud data PA and the second group of point cloud data PB are generated by two LiDAR sensors 11 located at different positions, wherein each group of point cloud data PA, PB is composed of a plurality of data points. The present invention utilizes the iterative nearest point (ICP) algorithm to reduce the distance between respective data points in the two groups of point cloud data PA, PB. In other words, the respective data points in the two groups of point cloud data PA, PB can be aligned to each other as close as possible.

Figure 5:
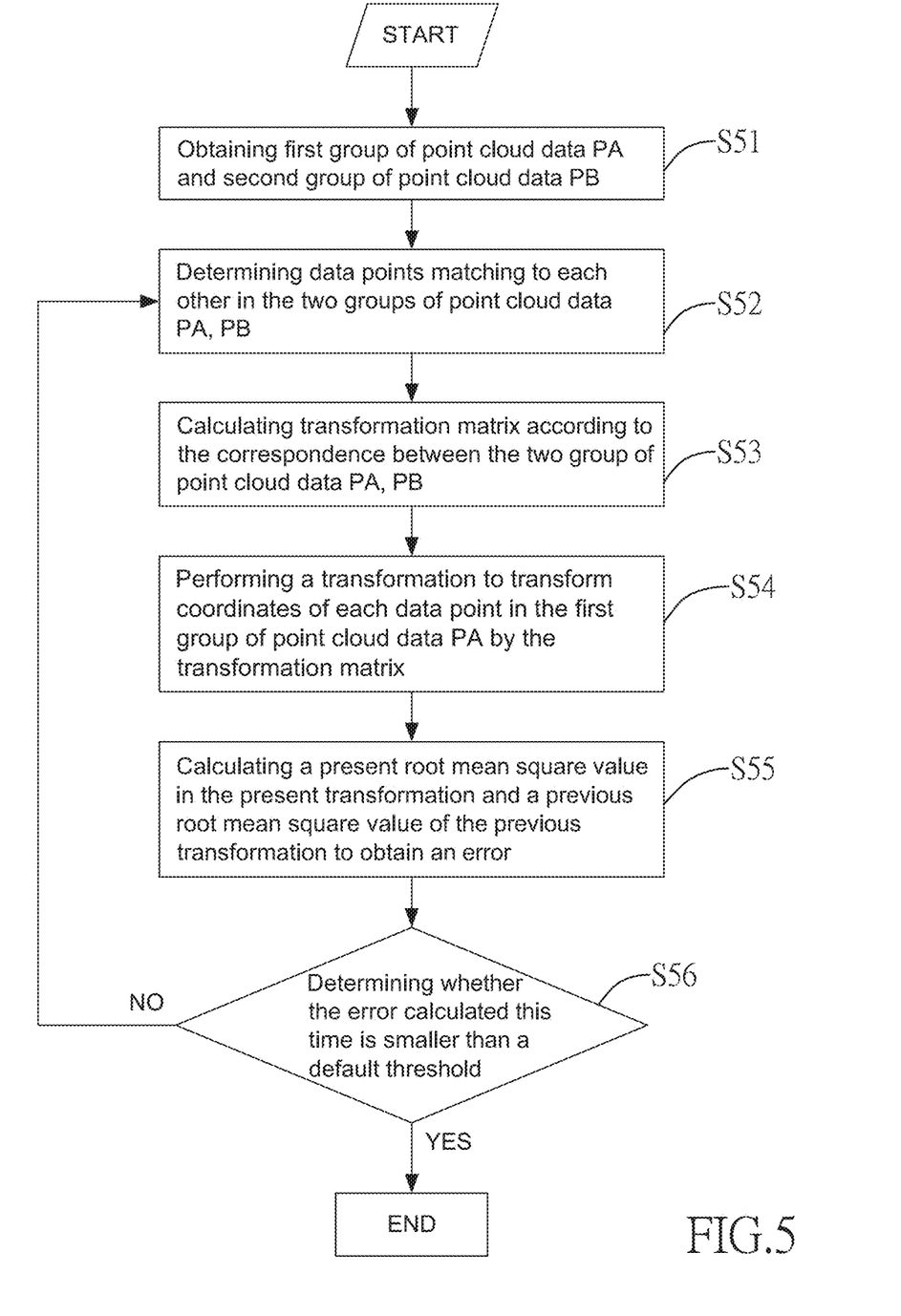
FIG. 5 is a flowchart of iterative closet point (ICP) algorithm used in the present invention.

With reference to FIG. 5, the iterative nearest point (ICP) algorithm is not the main feature of the present invention. The processes of the ICP algorithm mainly comprises the steps as follows:

S51: obtaining the first group of point cloud data PA and the second group of point cloud data PB;

S52: determining data points matching to each other in the two groups of point cloud data PA, PB to obtain correspondence between the first group of point cloud data PA and the second group of point cloud data PB;

S53: calculating a transformation matrix according to the correspondence between the two groups of point cloud data PA, PB;

S54: performing a transformation to transform coordinates of each data point in the first group of point cloud data PA by the transformation matrix;

S55: calculating a present root mean square value in the present transformation and a previous root mean square value of the previous transformation to obtain an error between the two root mean square values;

S56: determining whether the error calculated is smaller than a default threshold; if yes, the first group of point cloud data PA been aligned with the second group of point cloud data PB and ending the calculation; if not, repeating the step S52.

Figure 6:
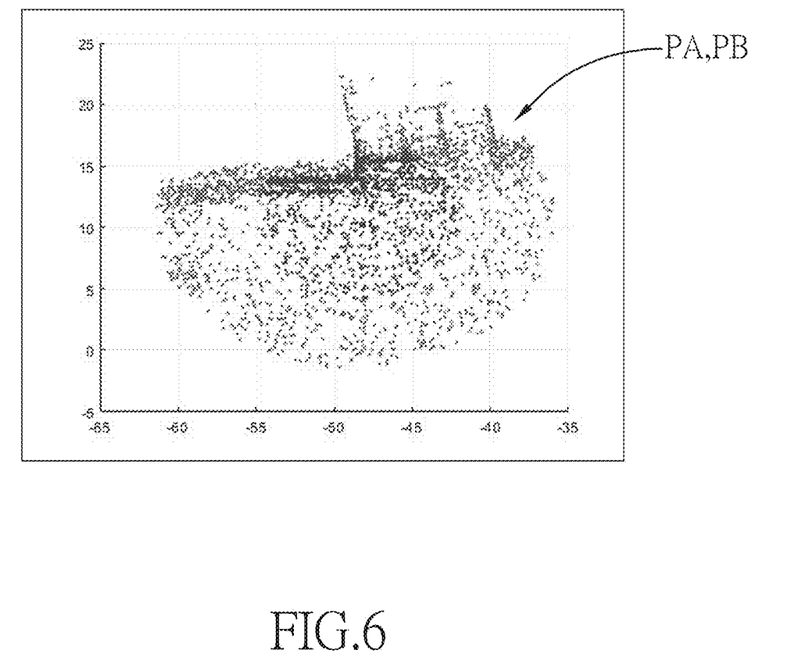
FIG. 6 shows the two clusters of point cloud data PA, PB in FIG. 4 being aligned to each other through the computation of ICP algorithm.

With reference to FIG. 6, the two groups of point cloud data PA, PB are aligned with each other after performing the ICP computation. In other words, if the sensing data measured by the LiDAR sensors 11 on the two vehicles have a common sensing area, the sensing data can be merged with each other and the coordinate errors between the sensing data can be reduced. Because sensing areas of different vehicles are different from each other, when the sensing areas of the vehicles are combined, a wider sensing area can be obtained and the blind zone or the dark zone for each vehicle can be mitigated. When the relay host 20 finishes the multi-vehicle data integration, the integrated point cloud data will be transmitted to the cloud server 30 for computation of map information. Since each data point in the point cloud data represents 3D information, the integrated point cloud data may represent the 3D coordinate information of an object.

Figure 7A:
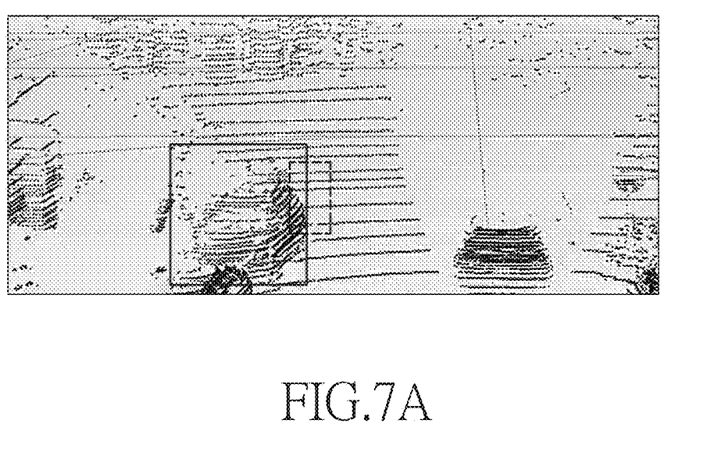
FIG. 7A shows point cloud data of environment obtained by LiDAR in accordance with the present invention.
Figure 7B:
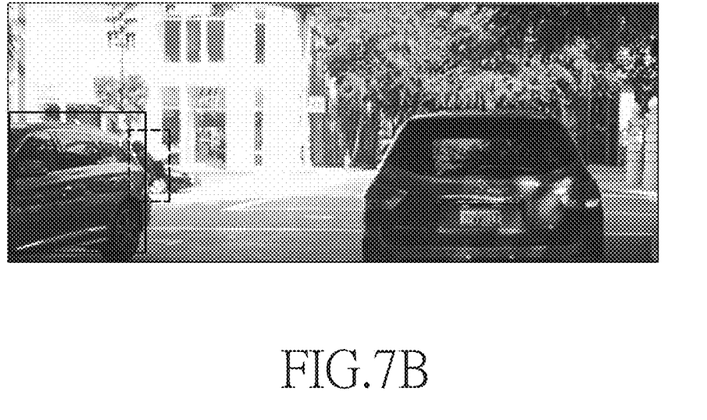
FIG. 7B shows image data of environment obtained by a camera in accordance with the present invention.
Figure 8:
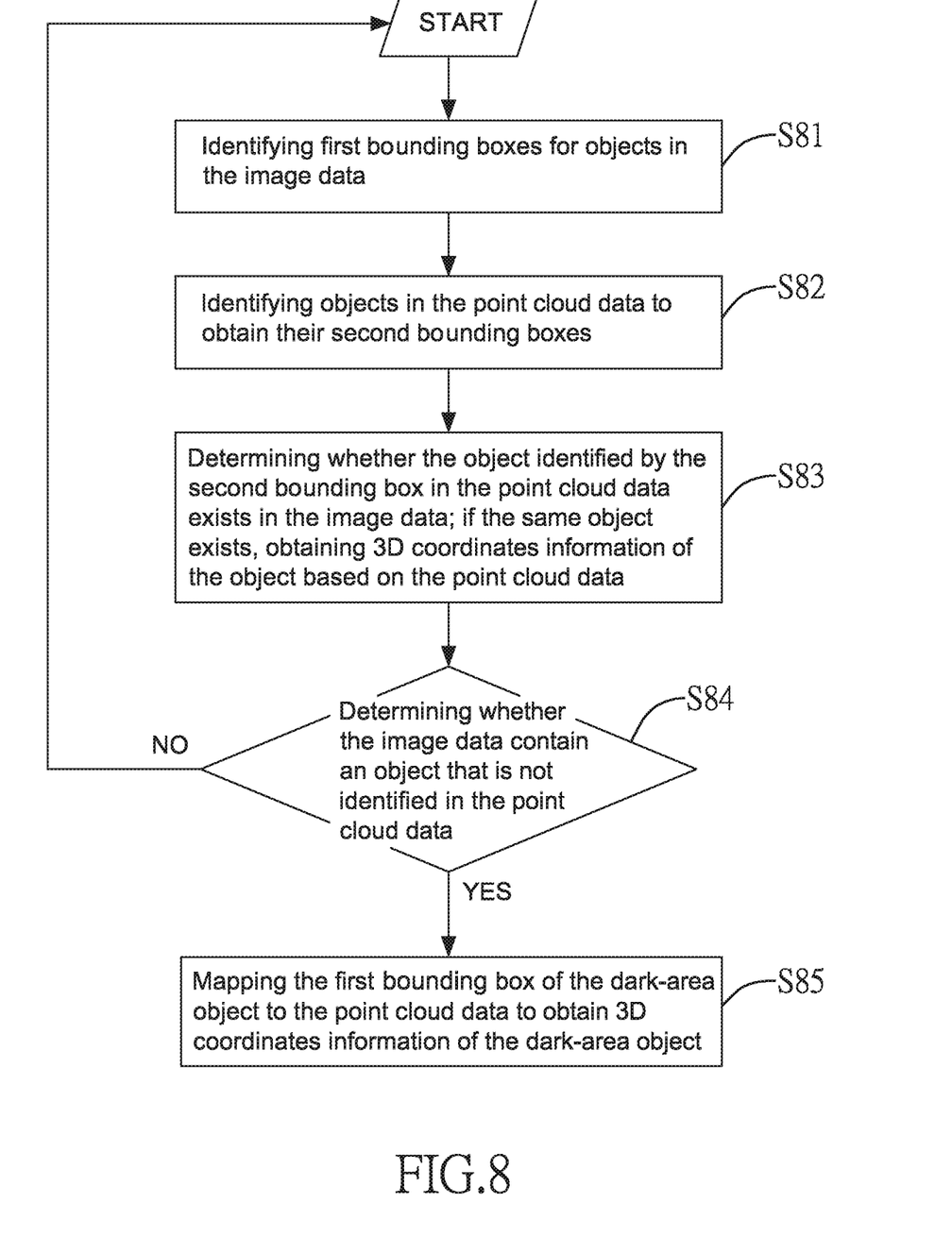
FIG. 8 is a flowchart of data processing performed by one single vehicle.

With regard to the mono-vehicle data processing mode in the step S34, when the relay host 20 only receives the sensing data from one vehicle, the relay host 20 processes the point cloud data and the image data provided by the vehicle. As shown in FIGS. 7A and 7B, the LiDAR sensor 11 and the camera 12 can respectively provide the point cloud data and the image data when detecting the same environment. According to the image data, it is found that there is a pedestrian behind a car. However, because the pedestrian is partially obscured by the car, it is difficult to determine whether a pedestrian exists or not according to the point cloud data. In order to correctly recognize an object being obscured, with reference to FIG. 8, the relay host 20 performs the mono-vehicle data processing mode having the following steps:

S81: identifying first bounding boxes for objects in the image data, for example, the objects may be vehicle objects, pedestrian objects, and quasi-pedestrian objects such as motorcycle riders or bicycle riders and be recognizable by known image recognition technology to identify a bounding box.

S82: identifying objects in the point cloud data to obtain their second bounding boxes, and mapping the second boding boxes to the image data for comparing the image data with the point cloud data.

S83: determining whether the object identified by the second bounding box in the point cloud data exists in the image data; if the same object exists, the object belongs to a bright-area object, wherein because each data point in the point cloud data represents 3D information, the 3D coordinates information of the bright-area object can be obtained based on the point cloud data. For example, because a vehicle can be identified in the image data and the point cloud data, the vehicle is one kind of bright-area object. If the identified vehicle in the image data is the same one in the point cloud data, the 3D coordinates information of the vehicle can be obtained based on the point cloud data.

S84: determining whether the image data contain an object that is not identified in the point cloud data. If there is an object not identified in the point cloud data but existed in the image data, the object belongs to a dark-area object. For example, a pedestrian behind the vehicle in the point cloud data may belong to a dark-area object. If the pedestrian is identified in the image data, the pedestrian is confirmed as a dark-area object.

S85: mapping the first bounding box of the dark-area object to the point cloud data to obtain 3D coordinates information of the dark-area object. Because the pedestrian and its first bounding box can be confirmed in the foregoing step S84, the coordinates of the first bounding box identified in the image data will be mapped to the corresponding coordinates in the point cloud data so as to locate the position of the dark-area object in the point cloud data.

After the relay host 20 completes the mono-vehicle data processing mode, the 3D coordinates information of the bright-area object and the dark-area object can be obtained from the point cloud data. The 3D coordinates information of the objects will be transmitted to the cloud server 30 for computation of dynamic map information.

When the cloud server 30 receives the 3D coordinates information of the objects calculated by the relay host 20, the cloud server 30 combines the 3D coordinates information with the base map to generate dynamic map information and then transmits the dynamic map information to the human-machine interface 15 of each vehicle. In another embodiment, the dynamic map information is high definition map (HD MAP) for automatic control of self-driving vehicles. In yet another embodiment, the dynamic map information is a map visible to the vehicle driver.

Figure 9:
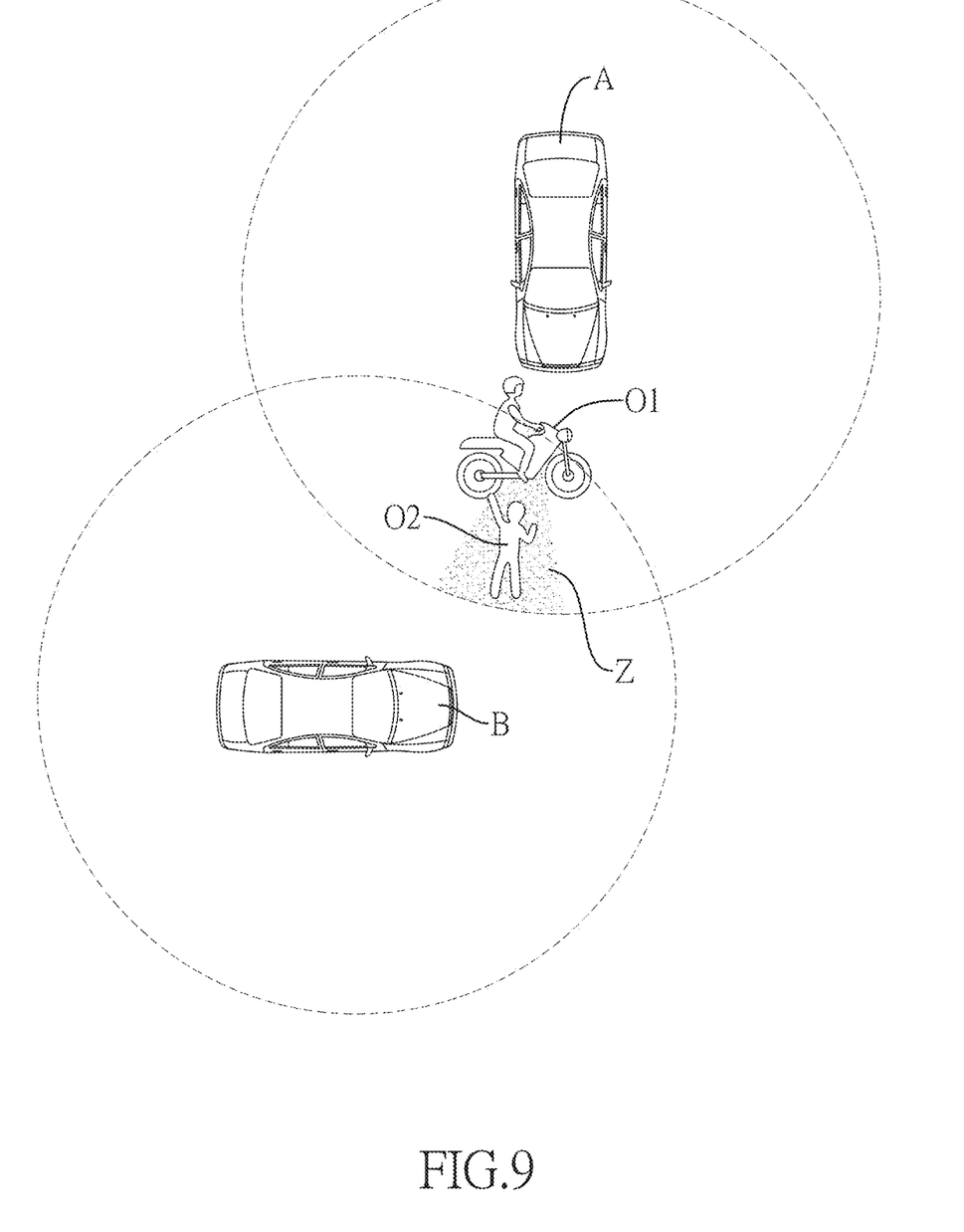
FIG. 9 is a schematic view showing obstacles identified by multiple vehicles in accordance with the present invention.

In short, by integrating sensing data from different vehicles or one single vehicle, the present invention may achieve effects as follows:

1. Sensing optimization for dark zone or blind zone: With reference to FIG. 9A, the vehicle A itself can only detect the first object O1 but cannot recognize the second object O2 in the dark zone Z. However, by integrating the point cloud data from different vehicles according to the present invention, for example, integrating the sensing data of vehicle B that can detect the second object O2, the sensing area for vehicle A can be effectively expanded. After providing the integrated point cloud data to each of the vehicles, vehicle A can recognize the second object O2 in the dark zone successfully. For the self-driving vehicle, its sensing ability can be improved to enhance the programming of driving routes.

2. Increasing dynamic information of the high definition map: Through the vehicle to infrastructure (V2I) communication, each relay host 20 can receive various kinds of dynamic information such as dark zones, obstacle identification and travelable spaces from different cars. The integrated dynamic map information contains real time information as references for the self-driving vehicle to determine preferable driving routes.

3. Distributed data computation architecture: Each of the relay hosts 20 performs the frond-end data processing to mitigate the computation burden of the cloud server 30 so that each vehicle can quickly obtain environment information in real time.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system for generating dynamic map information capable of providing environment information, the system comprising:
    multiple vehicle devices to be each respectively installed in different vehicles, each of the vehicle devices comprising:
        a light detecting and ranging (LiDAR) sensor sensing an environment around the vehicle to generate point cloud data;
        a camera capturing the environment around the vehicle to generate image data;
        a vehicle controller connected to the LiDAR sensor, the camera and a data transmission unit, controlling the point cloud data and the image data to be transmitted through the data transmission unit; and
        a human-machine interface connected to the vehicle controller;
    multiple relay hosts, wherein each relay host receives the point cloud data and the image data from the vehicles around the relay host itself and uses iterative closest point (ICP) algorithm to perform a multi-vehicle data integration mode to merge the point cloud data received from the vehicles to generate a processing result containing 3D coordinates information of objects in the environment, the relay host being configured to
    determine whether the image data contain an object that is not identified in the point cloud data, and determine that, if there is an object not identified in the point cloud data but exists in the image data, the object belongs to a dark-area object, and
    map a bounding box of the dark-area object to the point cloud data to obtain 3D coordinates information of the dark-area object; and
    a cloud server communicating with the multiple relay hosts and the multiple vehicle devices, receiving the processing result of the multi-vehicle data integration mode, and integrating the 3D coordinates information of objects with a base map to generate dynamic map information; and
    the cloud server transmitting the dynamic map information to the human-machine interface of each vehicle device.

2. The system as claimed in claim 1, wherein when the relay host receives the point cloud data and the image data only from single vehicle, the relay host performs a mono-vehicle data processing mode to generate the 3D coordinates information of the objects in the environment and provides the 3D coordinates information to the cloud server.

3. The system as claimed in claim 2, wherein the dynamic map information generated by the cloud server is high definition (HD) map information.

4. The system as claimed in claim 2, wherein the relay host uses iterative closest point (ICP) algorithm in the multi-vehicle data integration mode to merge the point cloud data.

5. The system as claimed in claim 4, wherein the point cloud data received by the relay host include a first group of point cloud data which comprises multiple data points sensed by a first vehicle and a second group of point cloud data which comprises multiple data points sensed by a second vehicle, and the ICP algorithm for the multi-vehicle data integration mode comprises steps of:
    (a) obtaining the first group of point cloud data and the second group of point cloud data;
    (b) determining the data points matching to each other in the first group of point cloud data and the second group of point cloud data to obtain correspondence between the first group of point cloud data and the second group of point cloud data;
    (c) calculating a transformation matrix according to the correspondence between the first group of point cloud data and the second group of point cloud data;
    (d) performing a transformation to transform coordinates of each data point in the first group of point cloud data by the transformation matrix;
    (e) calculating a present root mean square value in the present transformation and a previous root mean square value of the previous transformation to obtain an error between the present root mean square value and the previous root mean square;
    (f) determining whether the error calculated is smaller than a default threshold; if yes, the first group of point cloud data been aligned with the second group of point cloud data and ending the multi-vehicle data integration mode; if not, repeating the step (b).

6. The system as claimed in claim 2, wherein the cloud server accesses a map database in which the base map is stored.

7. The system as claimed in claim 1, wherein the dynamic map information generated by the cloud server is high definition (HD) map information.

8. The system as claimed in claim 1, wherein the point cloud data received by the relay host include a first group of point cloud data which comprises multiple data points sensed by a first vehicle and a second group of point cloud data which comprises multiple data points sensed by a second vehicle, and the ICP algorithm for the multi-vehicle data integration mode comprises steps of:
    (a) obtaining the first group of point cloud data and the second group of point cloud data;
    (b) determining the data points matching to each other in the first group of point cloud data and the second group of point cloud data to obtain correspondence between the first group of point cloud data and the second group of point cloud data;
    (c) calculating a transformation matrix according to the correspondence between the first group of point cloud data and the second group of point cloud data;
    (d) performing a transformation to transform coordinates of each data point in the first group of point cloud data by the transformation matrix;
    (e) calculating a present root mean square value in the present transformation and a previous root mean square value of the previous transformation to obtain an error between the present root mean square value and the previous root mean square;

(f) determining whether the error calculated is smaller than a default threshold; if yes, the first group of point cloud data been aligned with the second group of point cloud data and ending the multi-vehicle data integration mode; if not, repeating the step (b).

9. The system as claimed in claim 1, wherein the cloud server accesses a map database in which the base map is stored.

10. A method for generating dynamic map information capable of providing environment information, the method comprising steps of:
(a) sending a confirmation request from a vehicle device installed in a vehicle to a cloud server;
(b) designating a relay host among multiple relay hosts and informing the vehicle device that sends the confirmation request of the relay host being designated by the cloud server, wherein the cloud server refers to a location of the vehicle to designate the relay host near the vehicle sending the confirmation request;
(c) transmitting point cloud data and image data from the vehicle to the relay host being designated by the vehicle device, wherein the point cloud data is provided by a LiDAR sensor that senses an environment around the vehicle, and the image data is provided by a camera that captures the environment around the vehicle;
(d) when the relay host receives the point cloud data and the image data from multiple vehicles, the relay host using iterative closest point (ICP) algorithm to perform a multi-vehicle data integration mode to merge the point cloud data received from the multiple vehicles to generate a processing result containing 3D coordinates information of objects in the environment, wherein the relay host
determines whether the image data contain an object that is not identified in the point cloud data, and determines that, if there is an object not identified in the point cloud data but exists in the image data, the object belongs to a dark-area object, and
maps a bounding box of the dark-area object to the point cloud data to obtain 3D coordinates information of the dark-area object;
(e) the cloud server receiving the processing result of the multi-vehicle data integration mode from the relay host, and integrating the 3D coordinates information of objects with a base map to generate dynamic map information; and
(f) the cloud server transmitting the dynamic map information to a human-machine interface of the vehicle device, wherein the dynamic map information contains 3D coordinates information of the objects in the environment.

11. The method as claimed in claim 10, wherein when the relay host receives the point cloud data and the image data only from one single vehicle, the relay host performs a mono-vehicle data processing mode to generate 3D coordinates information of the objects in the environment and provides the 3D coordinates information to the cloud server.

12. The method as claimed in claim 11, wherein when the cloud server informs the vehicle device of the relay host being designated, the cloud server transmits a host identification code of the relay host being designated to the vehicle device; and
the vehicle device, according to the host identification code, transmits its point cloud data and the image data to the relay host being designated, and further transmits a vehicle identification code of the vehicle device to the relay host being designated.

13. The method as claimed in claim 11, wherein the mono-vehicle data processing mode performed by relay host further comprises steps of:
identifying first bounding boxes for objects in the image data to obtain positions of the objects in the image data;
identifying objects in the point cloud data to obtain second bounding boxes of the objects in the point cloud data; and
determining whether the object identified by the second bounding boxes in the point cloud data exists in the image data; wherein if a same object exists in both the point cloud data and the image data, the same object belongs to a bright-area object, and 3D coordinates information of the bright-area object is obtained according to the point cloud data.

14. The method as claimed in claim 13, wherein the objects being recognizable in the image data comprise vehicle objects, pedestrian objects, and quasi-pedestrian objects.

15. The method as claimed in claim 11, wherein the dynamic map information generated by the cloud server is high definition (HD) map information.

16. The method as claimed in claim 10, wherein when the cloud server informs the vehicle device of the relay host being designated, the cloud server transmits a host identification code of the relay host being designated to the vehicle device; and
the vehicle device, according to the host identification code, transmits its point cloud data and the image data to the relay host being designated, and further transmits a vehicle identification code of the vehicle device to the relay host being designated.

17. The method as claimed in claim 10, wherein the relay host uses iterative closest point (ICP) algorithm in the multi-vehicle data integration mode to merge the point cloud data.

18. The method as claimed in claim 17, wherein the point cloud data received by the relay host include a first group of point cloud data which comprises multiple data points sensed by a first vehicle and a second group of point cloud data which comprises multiple data points sensed by a second vehicle, and the ICP algorithm for the multi-vehicle data integration mode comprises steps of:
(a) obtaining the first group of point cloud data and the second group of point cloud data;
(b) determining the data points matching to each other in the first group of point cloud data and the second group of point cloud data to obtain correspondence between the first group of point cloud data and the second group of point cloud data;
(c) calculating a transformation matrix according to the correspondence between the first group of point cloud data and the second group of point cloud data;
(d) performing a transformation to transform coordinates of each data point in the first group of point cloud data by the transformation matrix;
(e) calculating a present root mean square value in the present transformation and a previous root mean square value of the previous transformation to obtain an error between the present root mean square value and the previous root mean square;
(f) determining whether the error calculated is smaller than a default threshold; if yes, the first group of point cloud data been aligned with the second group of point cloud data and ending the multi-vehicle data integration mode; if not, repeating the step (b).

19. The method as claimed in claim 10, wherein the dynamic map information generated by the cloud server is high definition (HD) map information.

* * * * *